Figure 1:
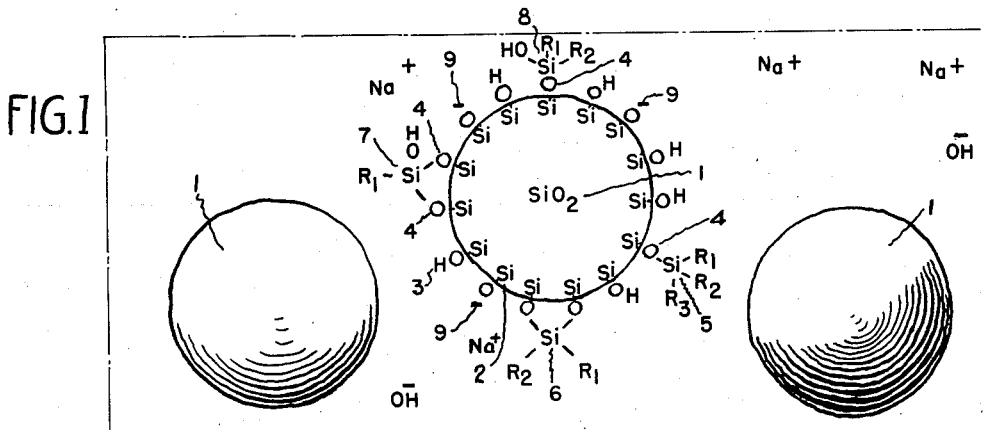

March 19, 1957  R. K. ILER  2,786,042
PROCESS FOR PREPARING SOLS OF COLLOIDAL PARTICLES OF
REACTED AMORPHOUS SILICA AND PRODUCTS THEREOF
Filed Nov. 23, 1951

INVENTOR:
RALPH K. ILER
BY *Albert B. Griggs &*
*Fred C. Carlson*
ATTORNEYS

United States Patent Office 2,786,042
Patented Mar. 19, 1957

2,786,042

PROCESS FOR PREPARING SOLS OF COLLOIDAL PARTICLES OF REACTED AMORPHOUS SILICA AND PRODUCTS THEREOF

Ralph K. Iler, Wilmington, Del., assignor to E. I. du Pont de Nemours and Company, Wilmington, Del., a corporation of Delaware Application November 23, 1951, Serial No. 257,835

12 Claims. (Cl. 260—37)

This invention relates to a sol of colloidal particles of amorphous silica having an average diameter of 10 to 150 millimicrons in which the particles have hydrocarbon radicals chemically attached directly to surface silicon atoms. The invention is further directed to processes for preparing aqua- and organosols, the particles of which have been made hydrophobic and organophilic by the reaction of the surface of the particles with hydrocarbon-substituted silanols.

Figure 2:
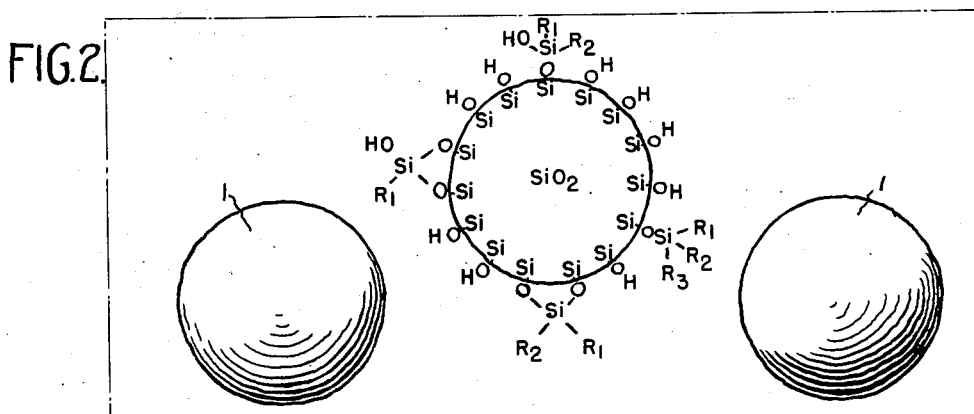
Figure 3:
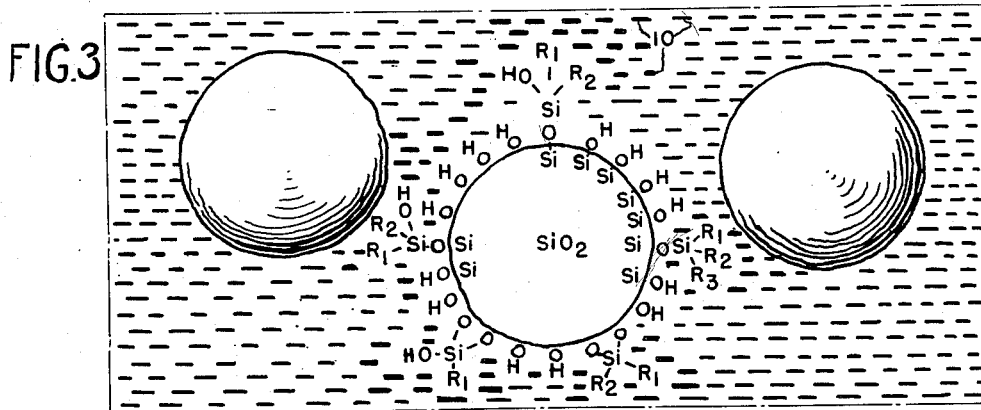

In the drawings,

Figure 1 illustrates particles made hydrophobic and organophilic in an alkaline aqueous system, and Figure 2 illustrates a similar organophilic particle in a neutral or acid system, and Figure 3 illustrates similar particles in an organic liquid.

It is known that an aquasol which contains particles of very small size, say 1 to 5 millimicrons, can be converted to an organosol by adding a water-miscible organic liquid to the aquasol and salting out much of the water. This process is subject to the difficulty that when the particle size of the particles in the sol increases beyond about 5 millimicrons, the transfer becomes more difficult and indeed virtually impossible. The procedure is further subject to the disadvantage that it can be used only with water-miscible organic liquids, whereas it is often most desirable to transfer silica to organic systems which are not water-miscible.

At the other extreme of particle size it is of course well understood that silica gels can be washed with water-miscible organic liquids to remove water and to produce organogels.

According to the present invention silica sols containing particles from 10 millimicrons to the upper limit of the colloidal range, say 150 millimicrons, can be transferred to brine-immiscible liquids. Even more, they can be transferred to water-immiscible organic liquids. The particles prepared in the manner to be described are organophilic and they have the distinct advantage that they form very stable systems in organic media. This is believed to be due to the fact that the chemically attached hydrocarbon groups serve as a barrier about the individual particles, preventing them from coming into contact with each other to form aggregates or gels.

Referring to the processes of the invention generally and referring to the drawings in somewhat greater detail, there is shown in Figure 1 a plurality of silica particles designated generally 1. It will be observed that one of these is shown semi-schematically as a cross-section. On this particle are shown the silicon atoms lying at the surface of the original colloidal particle. This silicon atom is represented by the numeral 2. At 3 there is shown a hydroxyl, OH, group attached to a surface silicon atom. It will be understood that the original silica particles in a sol are entirely covered with such hydroxyl groups and that the interior of the particle consists of amorphous silica.

The original sol particles covered with hydroxyl groups are modified as illustrated in Figure 1 by adding a strong alkali salt of a hydrocarbon-substituted silanolate. On the surface of the particle 1 the silanolate groups are shown attached to surface silicon atoms through oxygen. The oxygen groups are shown at 4 and the silanolate groups are shown at 5, 6, 7, and 8. The alkali cation illustrated in the drawing by sodium, is present in the sol and is illustrated by the usual chemical symbol. Since the solution is alkaline, the hydroxyl ions are also shown in the solution with the conventional symbol. In the alkaline medium the surface becomes charged as shown at 9.

The particles are therefore covered by several types of groups—mainly, hydroxy groups, negatively-charged oxygen atoms, and silanolate groups. It will be noted that several types of silanolate groups are shown. A silanolate group in which three hydrocarbon radicals are attached directly to a single silicon atom is shown at 5. Silanolate groups in which two hydrocarbon groups are attached to a single silicon atom are shown at 6 and 8. A silanolate group in which one hydrocarbon group is attached to the silanolate silicon atom is shown at 7.

It will thus be seen that the silicon atoms of the silanolate groups become part of the surface of the silica particle. Therefore, the hydrocarbon groups of the silanolate are in effect attached directly to the surface silicon atom of the particles. They will so be referred to herein for purposes of definition in describing the products.

In Figure 2 there is shown a similar group of silica particles which have been made organophilic by attaching hydrocarbon groups to the surface of the particles. A sol composed of such particles may be prepared either directly by treatment of a sol with a hydrocarbon-substituted silanol, or may be obtained by acidification of a sol such as that described in Figure 1.

As in Figure 1, a single particle is represented schematically to show the mode of attachment of the hydrocarbon groups to the surfaces of the particles. The particle shown differs from that previously described in some detail in that there is no charge on the surface and the surface is covered by hydroxyl groups and silanolate groups. The sodium salts which would be formed in a sol prepared by neutralizing the sol of Figure 1 are not shown in Figure 2.

In Figure 3 there is a representation similar to that of the previously described figures, but showing silica particles in an organic liquid. Such particles are prepared by mixing a sol such as that shown in Figure 2 with an organic liquid and then separating water from the system.

In Figure 3 a single particle is again represented schematically. The particle is similar to that shown in Figure 2 except that it is shown surrounded by molecules of organic solvent shown at 10. The organic solvent molecules are shown in such a manner as to represent the tendency of the molecules to cluster about the hydrocarbon groups on the surfaces of the silica particles.

The organophilic products illustrated in the figures and the sols described constitute novel products of the invention.

It is to be emphasized, though it will be obvious, that the drawing is not represented as being to scale, and the illustration mixes chemical symbols, ideas, and physical structures. The silica particles are represented as substantially uniform, spherical, dense, that is non-porous, discrete entities. It will be understood that the silica sol particles do not necessarily assume this shape though the preferred sols used according to the invention are, in facts, well represented by the figures.

The preferred aqueous sols for use according to the invention are those having particle sizes ranging from about 10 to 150 millimicrons in diameter and being composed of dense particles.

A silica sol prepared by ion-exchange as in the Bird U. S. Patent 2,244,325 is composed of silica particles well below 10 millimicrons in diameter. Such a sol is not well suited to use in processes of the present invention without further treatment.

Silica sols of dense particles, which it is preferred to use, may be made by heating a silica sol prepared by ion-exchange as described by Bird, U. S. Patent 2,244,325 to a temperature above 60° C. and adding further quantities of the same type of sol until at least five times as much silica has been added to the original quantity as was at first present. The particles in sols thus produced are in excess of 10 millimicrons in average diameter and, depending upon the conditions of treatment, range upwardly to, say about 150 millimicrons. The particles in a particular sol are surprisingly uniform in size. The process is fully set out in the application of Max F. Bechtold and Omar E. Snyder in United States application Serial No. 65,536, filed December 15, 1948, now Patent No. 2,574,902 issued November 13, 1951.

The particles of such a sol are quite dense, and this may be shown by drying the particles and then determining the amount of nitrogen adsorption. From the nitrogen adsorption it may be determined that the particles have a surface area not greatly in excess of that computed from the particle size as determined by electron micrographs. It will be evident that if the particles are not dense, but rather are porous, then the apparent surface as determined by nitrogen adsorption will be much higher than that expected from the particle diameters. Nitrogen adsorption, accordingly, affords an easy measure of the density of the particles. Summarizing then, the preferred sols for use as starting materials according to the present invention have particles of such density that the surface areas as determined by nitrogen adsorption is not greatly in excess of that computed for the particle size as determined by examination of an electron micrograph. The adsorption should not be more than about 30 percent greater than that computed from the apparent particle sizes.

The method of determining the surface area by nitrogen adsorption is described in "A new method for measuring the surface areas of finely divided materials and for determining the size of particles" by P. H. Emmett in "Symposium on New Methods for Particle Size Determination in the Subsieve Range" in the Washington Spring Meeting of A. S. T. M., March 4, 1941.

Sols prepared as above described ordinarily have a silica:alkali ratio of from 60:1 to 130:1. This refers to the weight ratio of total silica expressed as $SiO_2$ to total alkali expressed as $Na_2O$. Such sols may be adjusted with regard to pH by suitable additions of acid or removal of alkali.

Instead of the sols as above described which have extremely dense particles and very uniform particle size, one may use instead the non-uniform, non-dense type of product which can be made by precipitation of a silica gel and redispersion with alkali. Such a process is described, for instance, in the White U. S. Patent 2,375,738. The products prepared by redispersion of silica ordinarily have a good deal higher nitrogen adsorption than would be indicated by apparent diameter. This shows considerable porosity. The nitrogen adsorption is about 50 percent greater than that computed.

Still other silica gels may be used and it will be seen that it is important only that they have a particle size from about 10 to 150 millimicrons and that they be reasonably dense when dried. It is this latter property which sharply distinguishes them from silica gels. It is to be observed that all of the silica sols and silica particles suggested as suitable are amorphous.

A silica sol may advantageously be used which is essentially free from salts. This may be prepared, for instance, by dialysis. Silica sols essentially free from salts can also be prepared by removal of cations and anions by the use of suitable ion-exchangers. Sols of this type may be made in quite concentrated form and because of their high purity are especially suitable for some purposes of the present invention. The preparation of such sols is described and claimed in United States application Serial No. 183,902, filed September 8, 1950, by Joseph M. Rule, now Patent No. 2,577,485 issued December 4, 1951.

The concentration of the sol may vary widely, though it will generally be desirable to use as concentrated a sol as can be handled without getting permanent precipitation or gelling or excessive precipitation during processes of the invention. Ordinarily, the sols will contain between 2 and 20% by weight of $SiO_2$. While a precipitate may be temporarily formed in the sol when the organophilizing agent is mixed with the sol, no permanent harm will be done so long as the further process steps effect a redispersion of the particles. However, where such precipitates are formed, it is desirable to conduct the steps in the process rapidly to avoid aging of the colloidal silica in a precipitated or gelled state.

In such instances, also, operation at low temperatures will be advantageous.

The agent added to the sol to effect the chemical attachment directly to a silicon atom on the silica particles may broadly be any hydrocarbon-substituted silanol or derivative which will form a silanol in an aqueous medium. Since most silanols are unstable, it will ordinarily be preferred therefore to produce them in the aqueous system. This may be done by the use of materials of either of two classes: those in which the silanol hydroxy groups are substituted by anions such as chlorine, bromine, or fluorine, or by alkoxy groups, or silanolates may be used which are derived from the silanol or its siloxane condensation products by dissolving them in a solution of alkali.

In other words, the compounds which may be used are of the type $R_1SiX_3$, $R_1R_2SiX_2$ and $R_1R_2R_3SiX$, wherein $R_1$ is a hydrocarbon radical, and $R_2$ and $R_3$ are the same or different hydrocarbon radicals, and X is OH, halogen, OR, ONa or another radical which upon hydrolysis will produce an OH group attached to the silicon atom.

The hydrocarbon radicals can be alkyl, aryl, aralkyl, alkaryl, or alkylene-substituted aryl, and can be the same or different from each other. Regardless of whether there are one, two or three hydrocarbon radicals in the substituted silanol, the best results are obtained when the total number of carbon atoms in the hydrocarbon group attached to a single silicon atom does not exceed 20, and accordingly, this class is preferred. Short-chain alkyl and alkylene radicals having a chain range from 1 through 8 carbon atoms give very stable products and are preferred with the limitation above noted that the total number of carbon atoms in the hydrocarbon groups attached to a single silicon atom does not exceed 20. It is still more specifically preferred that the number not exceed 7.

Typical compounds of the type just described are methyl silicon trichloride, dimethyl silicon dichloride, trimethyl silicon chloride, ethyl silicon trichloride, diethyl silicon dichloride, vinyl silicon trichloride, phenyl silane triol, diphenyl silane diol, benzyl silicon trichloride, dibenzyl silicon dichloride, butyl trimethoxy silane, dibutyl diethoxy silane, trimethyl silanol, vinyl methyl dichloro silane. Additional organophilizing agents containing longer hydrocarbon chains attached to silicon are cetyl silicon trichloride, didodecyl silicon dichloride, octyl silicon trichloride. It will also be understood that the foregoing specific compounds instead of being in the form of the chloride aforementioned may be in the form of the bromide or iodide and, less preferred, the fluoride.

In the case of the alkoxy derivatives it is preferred to use the methoxy or ethyoxy because of the ease of hydrolysis of the derivatives in forming the silanols. It is to be noted particularly of the longer chain derivatives that some of the products are difficultly soluble in water. They can be added to the aqueous system in a volatile, water-miscible solvent. The solvent promotes distribution of the reagent throughout the sol after which the mutual solvent can be removed if desired before going further with the process.

A preferred type of organophilizing agent consists of water-soluble derivatives which may be prepared from suitable silanols or siloxane condensation products derived from the above types or from organo silicon intermediates, by dissolving them in an aqueous solution of a strong alkali. Solubilization is often promoted by the addition of a minor proportion of alcohol to the aqueous alkali. Such alkaline solutions may be used as, for example, 1 normal sodium hydroxide, potassium hydroxide, or lithium hydroxide, although the latter is not preferred. Especially interesting are products prepared using strong organic bases, such as the quaternary ammonium bases which contain not more than 2 or 3 carbon atoms per alkyl group attached to nitrogen. The preferred compound is tetramethyl ammonium hydroxide. Since it is the object to prepare salts which are highly soluble in water, those quaternary bases in which solubilizing groups are also present in the radicals attached to nitrogen are preferred. Such bases as tetraethanol ammonium hydroxide, for example, provide a highly soluble material and provide highly soluble silanolate salts. Other suitable quaternary ammonium bases are ethyl trimethyl ammonium hydroxide and vinyl trimethyl ammonium hydroxide. Since the solubilizing action of these compounds depends upon the presence of hydroxyl ions, they will be used in the form of their free bases which may be prepared by reacting the salts of these organic bases with silver hydroxide or sodium hydroxide, for example.

A silica sol of the type above discussed can be treated with a strong alkaline salt of a hydrocarbon-substituted silanol to produce modified sol particles as shown in Figure 1 and as heretofore described. It will also be observed that by using a hydrocarbon-substituted silicon halide which hydrolyzes in water to form the silanol one obtains a sol of the type shown and described in Figure 2. It has previously been observed that a sol of the type in Figure 1 may be converted to a sol of the type in Figure 2 by the addition of a suitable acid such as hydrochloric, sulfuric, acetic, sulfamic, and the like, or by withdrawing sodium as by ion-exchange. If desired, it is possible to prepare a sol such as that of Figure 1 from one like that in Figure 2 by the addition of a base. It will be noted that this may be advantageous where it is desired to form an alkali-stabilized sol as in Figure 1 and the stabilizing alkali is a weaker base than that required to form a silanolate. For example, such a base would be ammonium hydroxide. This latter method also provides an easy route for the preparation of the novel silanolates previously described which are made using quaternary ammonium bases, such as tetramethyl ammonium hydroxide.

In regard to the amount of the silanols to be combined with hydrocarbon radicals it will be noted that to improve the organophilic characteristics of the silica particles it is unnecessary for their surfaces to be completely covered with organophilic radicals. In fact, in preparing the alkali-stabilized sols of the invention as shown in Figure 1 it is preferred that no more than about half of the surface be covered by hydrocarbon groups. This is illustrated in Figure 1 as has previously been noted.

Particles which have only partial coverage down to say about 5% of the surface are sufficiently organophilic to be readily held and to form stable sols with polar types of organic solvents. Such solvents, for example, as acetone, tertiary butyl alcohol, and normal propyl alcohol form quite stable sols with these products.

If, however, sols are to be formed which contain non-polar solvents such as benzene, toluene, and the like, or if it is desirable that the silica be entirely compatible with non-polar organic systems, such as hydrocarbons or chlorinated hydrocarbons, then it is preferred that considerably greater coverage of the surface be attained. This coverage may range upwardly to substantially complete coverage.

While the amount of silanolate required to give coverage of the surface will vary with the size of the hydrocarbon groups and their degree of branching, an amount adequate to form a monolayer and to obtain substantially complete coverage will be supplied by adding to the system the equivalent of 1 silanolate group for each 25 square angstroms of silicon surface in the sol. A 5% coverage would correspond to about 1 molecule of silanolate for each 500 square angstroms of silica surface in the sol.

In order that this type of calculation may be understood, the following specific calculation is supplied by way of example:

Area of surface covered by each organosilicon molecule=25 A².

Surface area per gram of silica particle (specific surface area)=

$$\frac{2958}{d} \text{ sq. meters/gm.}$$

where $d$=particle diameter in millimicrons $$\frac{\text{Moles of silicon comp.}}{\text{Grams of SiO}_2} = \frac{2958}{d} \times \frac{10^{20}}{25} \times \frac{1}{6.02 \times 10^{23}} = \frac{2.958}{150d}$$

With arithmetic simplified, this expression becomes $$\frac{19.7}{d}$$

millimoles of organosilicon compound per gram of silica for complete coverage, while for the 5% minimum coverage above-mentioned the expression becomes $$\frac{0.986}{d} \text{ millimoles}$$

Thus, for 20 millimicron silica particles and an organosilicon reagent having a molecular weight of 300 (an approximate maximum value for a compound containing 20 carbon atoms), complete surface coverage would require 0.296 g. of the silicon compound per gram of the silica particles, or about 30% by weight. For complete surface coverage of 20 millimicron particles with an organosilicon reagent having a molecular weight of 108.6 [(CH₃)₃SiCl] 0.107 g. or about 11% by weight would be required. For a minimum coverage of 5% of the surface, 1.5% by weight would be required of the organosilicon compound with a M. W. of 300 and only .53% of that with a M. W. of 108.6.

Organic liquids which form the organosols of the present invention are preferably those which will form a second liquid phase when added to a saturated solution of sodium chloride at 25° C. with good mixing. This is of course what is meant when reference is made to a liquid as being immiscible with brine.

Suitable organic liquids are such organic solvents as the monohydric alcohols, such as normal propanol, normal butanol, isopropanol, isobutanol, tertiary butyl alcohol, and methyl isobutyl carbinol. The alcohols can be substituted, as, for example, such materials as H(CF₂)₆, CH₂OH. Ethers and substituted ethers are suitable solvents. For example, there can be used diethyl ether, dichloroethyl ether, propylene oxide, and so forth. Other suitable solvents comprise ketones—for example, acetone, methyl isopropyl ketone and methyl ketone; esters, such as butyl acetate; amides and substituted amides, such as dimethyl formamide; and ethers of phosphorous oxyacids, such as tributyl phosphate, triisoamyl phosphate, and triethyl phosphate.

Present also in the solvent system may be hydrocarbons. Other organic solvents which may be used thus include benzene, toluene, normal hexane, cyclohexane, chlorinated hydrocarbons such as carbon tetrachloride, chloroform, and tetrachloroethylene. It is to be noted of the hydrocarbons and other such non-polar liquids which do not contain oxygen or nitrogen atoms that it will often be found very advantageous to include at least small amounts of one of the polar solvents of the types previously discussed.

The organic liquid can of course be present in amounts ranging from just sufficient to provide a dispersion medium for the silica to relatively large quantities where a dilute organosol is desired. It is further to be noted that mixture of these organic liquids may be used as described and that water need not be separated entirely from the organic liquid. A large amount of organic liquid may be used to effect the extraction of the silica and may thereafter be removed in part by distillation. Again, transfer may be effected to still other organic liquids. A preferred method is to use a mixture of a readily volatile polar liquid mixed with a minor quantity of a higher boiling organic liquid during the extraction step and thereafter removing the more volatile component, thus obtaining a concentrated sol in the less volatile component.

In processes of the invention the separation of the silica from the water and its transfer to the organic-liquid solvent will be effected by mixing with the water the liquid into which it is desired to transfer the silica. This may be done after coating of the particles is essentially complete, or it may be done even before addition of the organic silicon halide. Before transfer can be effected the pH must be dropped below neutrality. Since the alkali-stabilized colloidal particles, as shown in Figure 1, are generally much more compatible with water than with organic solvents due to their ionic nature, ordinarily the transfer will be carried out at a pH of between 0 and 5 and preferably at a pH between about 2 and 3.

The organosols, and by this it is meant to include sols containing some water, are suitable for a wide variety of uses. Organosols containing comparatively little water can readily be introduced into a wide variety of organic media. They may be mixed with liquid or dry lubricants, such as hydrocarbon oils, fluorocarbon oils, silicone oils, vegetable oils, polyether oils, graphite, talc, molybdenum sulfide, powdered mica to give improved viscosity, wetting power, body, water resistance, and the like in many of the ordinary uses of these materials. Greases result when somewhat larger quantities of the organosol are incorporated in these oils. Hydraulic fluids can also be thickened.

The organosols can be used as a means of introducing colloidal silica as a clarifying agent and adsorbent for purification of petroleum products. It is particularly effective, since it readily disperses in the organic medium to be treated, and yet can readily be caused to agglomerate and settle out with the impurities at the end of the process. This organosol also promotes dispersion of other types of decolorants such as clays. Vapors may also be effectively scrubbed by bubbling them through the organosols.

Fuels, particularly diesel fuels and rocket fuels, can be improved by having silica dispersed therein by means of these organosols because it provides a catalytic surface for combustion and also keeps the combustion chamber clean.

Waxes, especially those used in coating paper, are greatly improved by addition of these silica organosols. They have more body when hot, permitting thicker coatings by a single dip, and preventing blocking during hot weather. Wax compositions containing organic solvents such as paste waxes and waxes dissolved or suspended in naphthas can advantageously be modified with organosols as herein described.

Pesticides and insecticides, particularly those in organic solvents, are greatly improved by incorporation of dispersed organophilic silica in the organosol. The silica may act as a diluent, extender, carrier, activator, dispersing agent, wetting or emulsifying agent, and thickener. The latter use is particularly applicable to the preparation of pastes and salves used on farm animals.

The organosols form a vehicle by which the colloidal silica can be dispersed into molded plastics to act as a filler to improve tensile and compression and shear strength. Even transparent or translucent plastics which have an index of refraction near that of colloidal silica will retain their transparency when filled. The colloidal silica also serves to diminish the tackiness of the surfaces of plastics after molding, or of films after extrusion.

In rubber and other linear organic polymers, the hydrophobed silica in an organosol can be dispersed directly in the latex or in monomer or low polymer solutions before polymerization. The surface coating on the colloidal silica prevents it from adsorbing catalysts, activators, and the like, and thus does not interfere with the final polymerization or curing. The colloidal silica can also be incorporated into the finished polymer before it is spun into fibers or extruded into sheets. Tensile, tear strength, tenacity, temperature resistance, and resistance to deformation are greatly improved in these cases.

These organosols act as dispersing agents, and often modify the polymerization when incorporated into dispersions and emulsions of monomers before polymerization.

The silica dispersed in organic polymers acts as a delusterant, anti-slipping agent, and stiffening agent, and improves the pentration, retention, and color of the dyes used.

Synthetic rubbers, such as neoprene and GRS, are, of course, included in this summary.

These organosols can be combined with organic polymer-type protective coatings, including resins, lacquers, drying oils, etc., to improve adhesion and strengthen and harden the protective film. They are also effective in the oleoresinous paints and in the chemically-resistant polymeric coatings such as "Teflon." The colloidal silica acts as a flatting agent, a dispersing and suspending agent, a thickener, a wetting agent, an extender, and the like.

The silica having an organophilized coating can be dried directly out of the aqua organosols to form a solid dry product. Where at least 50% of the surface of the silica particles has been covered with organophilic groups, these dry prdoucts can be dispersed directly into organic solvents, or into organic resins, or can be incorporated into organic solvent dispersions of other materials. While for some uses it is desirable to maintain the products in a wet condition, nevertheless there are cases in which it is desirable to dry the products and then incorporate the dry products in the composition to which it is to be added. The dry products can be directly dispersed in the various compositions above discussed with reference to organosols.

In order that the invention may be better understood, the following specific examples are given in addition to those already generally described:

*Example 1*

An aqueous solution of colloidal silica was prepared by passing a 3% solution of sodium silicate ($SiO_2$:$Na_2O$ ratio of 3.3:1) through a cation exchange resin to replace the sodium ions with hydrogen in the manner described in the U. S. Patent No. 2,244,325 issued June 3, 1941, to Paul G. Bird. This solution was made alkaline by the addition of sodium silicate. The $SiO_2$:$Na_2O$ ratio was then 30:1. The solution was evaporated at 100° C. until it had a $SiO_2$ concentration of 18%, and then diluted to a $SiO_2$ concentration of 1.8%. The silica in the aquasol consisted of dense spherical particles having an average diameter of about 10 millimicrons.

One liter of the aquasol prepared as above described, was placed in a 2.5 liter flask and, with the reactants at room temperature, 100 cc. of a solution of sodium methyl silanolate containing the equivalent of 9.8% $SiO_2$ was added. The solution was neutralized to pH 7 with formic acid, whereupon it became clear and highly fluid. The solution was heated to 60° C., whereupon it again became alkaline. It was acidified to pH 4, and was then boiled for 1 hour and acidified from time to time, the final pH being about 2. The mixture was a very cloudy solution, but contained no precipitate.

Two hundred ccs. of tertiary butyl alcohol were added to the warm solution and stirred for one-half hour, to yield a relatively clear mixture. Three hundred grams of sodium chloride was added to saturate the mixture which was then permitted to stand in a separatory funnel until 100 ccs. of a very viscous, sticky liquid phase, which was an aqua-organosol, could be separated. This phase was diluted with an equal volume of tertiary butyl alcohol to give a fluid sol which could be filtered. A portion of the filtered sol was concentrated by evaporation and diluted with about three times its volume of benzene, causing the formation of a white precipitate which was filtered and washed with benzene. The precipitate containing 29.2% $SiO_2$ by weight was readily dispersed in the lower alcohols and acetones and in normal butyl alcohol with the aid of mechanical action to yield stable sols.

Example 2

A colloidal silica solution was prepared following the processes described in the above-mentioned Bechtold and Snyder U. S. Patent 2,574,902. The sol used contained 30.03% $SiO_2$ by weight, the particles had an average diameter of 17 millimicrons, and a pH of about 9.0 was used. A 487-gram sample of this aquasol was added in a thin stream with vigorous agitation to a solution of 5 milliliters of C. P. 37% HCl in 20 ccs. of water. The pH of the resulting solution was 1.7. A solution containing 11.7 grams of a mixture of $CH_3SiCl_3$ and $(CH_3)_2SiCl_2$ dissolved in 512 grams of dry tertiary butyl alcohol was added to the acidified aquasol and the mixture allowed to stand at room temperature for 1 hour. Seventy-five grams of sodium chloride crystals were then added to saturate the mixture which was allowed to stand for an additional 2 hours until separation into 2 layers was essentially complete. The brine layer (330 grams) was separated and discarded. To 350 grams of the aqua-organosol layer containing 17.7% $SiO_2$ by weight and 16.7% $H_2O$ by weight was added 59 grams of C. P. benzene causing the separation of an additional 6 grams of brine layer which was removed and discarded.

The aqua-organosol layer (358 grams) containing 16.2% $SiO_2$ and 13.7% $H_2O$ by weight was placed in a 1 liter three-neck round bottom flask heated over an oil bath and fitted with an air stirrer, and a distilling column topped by a head permitting return of the organic layer of the distillate to the distilling column. The distillation was continued over a period of 5 hours. The separate water layer was drawn off from the distillate from time to time in the temperature range of 65 to 80.2° C.

The residue (233 g.) in the distilling flask was a clear organosol containing 0.39% water and 24.9% $SiO_2$. The sol was stable at room temperature.

Example 3

The silica sol used in this example was prepared according to the process of the Bechtold and Snyder United States application Serial No. 65,536, filed December 15, 1948. The sol contained 3.8% $SiO_2$ by weight and had an $SiO_2:Na_2O$ molar ratio of 80:1 and a particle diameter of about 17 millimicrons. A 504-gram sample of this sol was acidified by adding it in a fine stream to a vigorously stirred solution of 5 ccs. of 37% HCl in 20 ccs. of water. The pH after mixing was 1.7. To 250 grams of this solution was added a solution of 6 grams of a mixture of $CH_3SiCl_3$ and $(CH_3)_2SiCl_2$ in 250 grams of tertiary butyl alcohol, and the mixture was allowed to stand for 1 hour. Thirty-five grams of sodium chloride were then added to salt the mixture out into 2 layers, the separation being complete in about 2 hours. The brine layer was drawn off and discarded. The organic layer (360 grams) had a pH of 0.7. To 124 grams of this tertiary butyl alcohol extract was added 62 grams of toluene. A layer of 7 grams of raffinate separated and was removed.

The separation of the tertiary butyl alcohol-toluene-water azeotrope was carried out in a manner similar to that described in Example 2, over a distillation range 73.0 to 108.5° C. A total of 200 grams of tertiary butyl alcohol and 100 grams of toluene were added during the course of the distillation of 166 grams of the original extract. One-half of this mixture was added at the start of the distillation, and the remainder added drop-wise during the distillation. The product was a translucent, slushy mixture, but the slushy phase could be repeptized by addition of a small quantity of tertiary butyl alcohol to give a stable sol.

Examples 4, 5, 6, and 7

These examples were carried out exactly as those described in Examples 2 and 3. The essential data concerning the materials used, reaction conditions, time, and composition of product are listed in the following table.

| Example No. | 4 | 5 | 6 | 7 |
|---|---|---|---|---|
| Raw Materials Used, Gms.: | | | | |
| Silica aquasol (same as Example 2) | 3,328 | 4,700 | 4,700 | 4,700 |
| HCl, 37% C. P. | 58.4 | 75 | 70 | 70 |
| $H_2O$ | 3,450 | 3,450 | 3,450 | 3,450 |
| Tertiary butyl alcohol— | | | | |
| 1st addn. | 3,496 | 4,924 | 4,934 | 4,624 |
| Total TBA added | 4,751 | 9,164 | 5,310 | 5,504 |
| A mixture of $CH_3SiCl_3$ and $(CH_3)_2SiCl_2$ | 79.9 | 115.3 | 115.4 | 115.5 |
| NaCl | 1,756 | 2,036 | 2,000 | 1,970 |
| Benzene | 853 | 3,302 | | |
| Toluene | | | 5,295 | 4,860 |
| Gms. Extract | 5,116.3 | 7,083 | 6,150 | 6,607 |
| Gms. $H_2O$ Layer | 7,051 | 8,040 | 7,673 | 8,034 |
| pH Extract | .7 | .84 | .63 | .61 |
| pH $H_2O$ Layer | | .67 | .81 | .49 |
| pH at end of $SiO_2$ Acidification | 1.84 | 1.78 | 2.00 | 2.05 |
| Percent $H_2O$ in Extract | 11.5 | 11.2 | 11.3 | 12.5 |
| Gms. of Extract Fractionated | 6,940 | 10,069 | 9,904 | 10,000 |
| Head Temp.— | | | | |
| at Start, °C | 66 | 68.1 | 70.7 | 71.9 |
| at End, °C | 78 | 78 | 97.6 | 98.4 |
| Total Time fractionated, hours | 16 | 18 | 10 | 12½ |
| Distillate, Gms.— | | | | |
| $H_2O$ Layer | 742.5 | 884.1 | 795.2 | 893.2 |
| Organic Layer | 1,982.4 | 6,288.2 | 4,877.5 | 4,756.4 |
| Wt. of Product, gms. | 3,582 | 6,834 | 6,486 | 6,110 |
| Percent $H_2O$ in Product | .83 | .70 | .5 | .41 |
| Percent $SiO_2$ in Product | 24.83 | 20.46 | 20.63 | 17.91 |

I claim:

1. A sol of colloidal particles of amorphous silica having an average diameter of from 10 to 150 millimicrons, at least 5 percent of the surface silicon atoms on the particles having chemically attached directly thereto from 1 through 3 alkyl radicals, the total number of carbon atoms in the alkyl radicals attached to any one silicon atom being in the range of from 1 through 20.

2. An alkali-stabilized aquasol of colloidal particles of amorphous silica having an average diameter of from 10 to 150 millicrons, the particles having monovalent hydrocarbon radicals chemically attached directly to at least 5 percent of the surface silicon atoms.

3. An alkali-stabilized aquasol having a pH from 8 to 10.7 and being composed of colloidal particles of amorphous silica having an average diameter of from 10 to 150 millimicrons, at least 5 percent of the surface silicon atoms on the particles having chemically attached directly thereto from 1 through 3 alkyl radicals, the total number of carbon atoms in the alkyl radicals attached to any one silicon atom being in the range of from 1 through 20.

4. An alkali-stabilized aquasol of colloidal particles of amorphous silica having an average diameter of from 10 to 150 millimicrons and being so dense that their surface area as determined by nitrogen adsorption is not more than 30% in excess of that computed for the particle size as determined by examination of an electron micrograph, the particles having monovalent hydrocarbon radicals chemically attached directly to at least 5 percent of the surface silicon atoms.

5. An alkali-stabilized aquasol having a pH from 8 to 10.7 and being composed of colloidal particles of amorphous silica having an average diameter of from 10 to 150 millimicrons, at least 5 percent of the surface silicon atoms on the particles having chemically attached directly thereto from 1 through 3 alkyl radicals, the total number of carbon atoms in the alkyl radicals attached to any one silicon atom being in the range of from 1 through 7.

6. An organosol of colloidal particles of amorphous silica having an average diameter of from 10 to 150 millimicrons, the particles having hydrocarbon radicals chemically attached directly to at least 5 percent of the surface silicon atoms.

7. In a process for making organophilic the particles in an aqueous sol of colloidal particles of amorphous silica having an average particle diameter of from 10 to 150 millimicrons, the step comprising mixing with said sol an aqueous solution of a silanolate which is a strong alkali salt of a monovalent hydrocarbon-substituted silanol having hydrocarbon substituents totaling less than 7 carbon atoms per silanolate radical and adjusting pH to 8 to 10.7.

8. In a process for making organophilic the particles in an aqueous sol of colloidal particles of amorphous silica having an average particle diameter of from 10 to 150 millimicrons, the step comprising mixing with said sol a silanolate which is a strong alkali salt of a monovalent hydrocarbon-substituted silanol having from 1 to 2 hydrocarbon substituents, with a total of less than 7 carbon atoms, on each silicon atom, the proportion of silanolate to silica being from $$\frac{0.986}{d} \text{ to } \frac{19.70}{d}$$

millimoles of silanolate per gram of silica where $d$ is the silica particle average diameter in millimicrons.

9. In a process for making organophilic the particles in an aqueous sol of colloidal particles of amorphous silica having an average particle diameter of from 10 to 150 millimicrons, the step comprising mixing with said sol a silanolate which is a strong alkali salt of a monovalent hydrocarbon-substituted silanol having from 1 to 2 hydrocarbon substituents, with a total of less than 7 carbon atoms, on each silicon atom, the proportion of silanolate to silica being from $$\frac{0.986}{d} \text{ to } \frac{19.70}{d}$$

millimoles of silanolate per gram of silica where $d$ is the silica particle average diameter in millimicrons, lowering the pH to below 6, and mixing the sol with an organic liquid and separating water from the sol.

10. In a process for making organophilic the particles in an aqueous sol of colloidal particles of amorphous silica having an average particle diameter of from 10 to 150 millimicrons, the step comprising mixing with said sol a silanolate which is a strong alkali salt of a monovalent hydrocarbon-substituted silanol having from 1 to 2 hydrocarbon substituents, with a total of less than 7 carbon atoms, on each silicon atom, the proportion of silanolate to silica being from $$\frac{0.986}{d} \text{ to } \frac{19.70}{d}$$

millimoles of silanolate per gram of silica where $d$ is the silica particle average diameter in millimicrons, lowering the pH to below 6, and extracting the organophilized silica particles from the sol with a brine-immiscible organic liquid.

11. In a process for making organophilic the particles in an aqueous sol of colloidal particles of amorphous silica having an average particle diameter of from 10 to 150 millimicrons, the step comprising adding to the sol an organosilicon compound selected from the group consisting of compounds of the formulae $R_1SiX_3$, $R_1R_2SiX_2$ and $R_1R_2R_3SiX$, wherein $R_1$, $R_2$ and $R_3$ are hydrocarbon radicals and X is selected from the group consisting of halide, —OR and —ONa group, hydrolyzing the organosilicon compound to produce a monovalent hydrocarbon-substituted silanol having an —OH group attached to the silicon atom thereof, the proportion of hydrocarbon-substituted silanol being from $$\frac{0.986}{d} \text{ to } \frac{19.70}{d}$$

millimols of silanol per gram of silica, where $d$ is the silica particle average diameter in millimicrons, and effecting contact between said silanol and the silica particles in the sol whereby to produce a surface coating of monovalent hydrocarbon groups on at least 5% of the surface of said silica particles.

12. In a process for making organophilic the particles in an aqueous sol of colloidal particles of amorphous silica having an average particle diameter of from 10 to 150 millimicrons, the step comprising adding to the sol an organosilicon compound selected from the group consisting of compounds of the formulae $R_1SiX_3$, $R_1R_2SiX_2$ and $R_1R_2R_3SiX$, wherein $R_1$, $R_2$ and $R_3$ are hydrocarbon radicals and X is selected from the group consisting of halide, —OR and —ONa group, hydrolyzing the organosilicon compound to produce a monovalent hydrocarbon-substituted silanol having an —OH group attached to the silicon atom thereof, the proportion of hydrocarbon-substituted silanol being from $$\frac{0.986}{d} \text{ to } \frac{19.70}{d}$$

millimols of silanol per gram of silica, where $d$ is the silica particle average diameter in millimicrons, effecting contact between said silanol and the silica particles in the sol whereby to produce a surface coating of monovalent hydrocarbon groups on at least 5% of the surface of said silica particles, mixing an organic liquid with the sol of coated silica particles, and separating water therefrom.

References Cited in the file of this patent

UNITED STATES PATENTS

| | | |
|---|---|---|
| 2,441,422 | Krieble et al. | May 11, 1948 |
| 2,567,315 | Bidaud | Sept. 11, 1951 |
| 2,567,316 | Bidaud | Sept. 11, 1951 |
| 2,574,902 | Bechtold et al. | Nov. 13, 1951 |
| 2,578,605 | Sears | Dec. 11, 1951 |
| 2,583,606 | Siriani et al. | Jan. 29, 1952 |
| 2,610,167 | Te Grotenhuis | Sept. 9, 1952 |
| 2,676,182 | Daudt et al. | Sept. 13, 1954 |

FOREIGN PATENTS

| | | |
|---|---|---|
| 504,961 | Belgium | Aug. 14, 1951 |

OTHER REFERENCES

Vail: Soluble Silicates, vol. 1, Reinhold, 1952, pages 100 and 101.

Zsigmondy: The Chemistry of Colloids, Wiley, 1917, pages 20 and 21.